United States Patent [19]

Montgomery et al.

[11] 4,106,639

[45] Aug. 15, 1978

[54] CONTAINER CONVEYOR APPARATUS AND METHOD FOR VESSEL LOADING CRANE-YARD INTERFACE

[75] Inventors: Murray Mathews Montgomery, Oakland; William Francis Gilger, Concord; William Winfield Steiner, San Francisco, all of Calif.

[73] Assignee: Matson Navigation Company, San Francisco, Calif.

[21] Appl. No.: 750,073

[22] Filed: Dec. 13, 1976

[51] Int. Cl.² .............................................. B65G 67/00
[52] U.S. Cl. .................................... 214/14; 198/300; 212/15; 214/152
[58] Field of Search .................. 214/12, 14, 152, 658, 214/89, 1 BB; 198/300, 718, 774, 775; 212/11, 14, 15

[56] References Cited

U.S. PATENT DOCUMENTS

| | | | |
|---|---|---|---|
| 3,420,358 | 1/1969 | Iversen | 198/774 |
| 3,473,643 | 10/1969 | Janiske | 198/775 |
| 3,812,987 | 5/1974 | Watatani | 212/11 X |
| 4,018,349 | 4/1977 | Hupkes | 212/14 X |

*Primary Examiner*—Robert G. Sheridan
*Assistant Examiner*—George F. Abraham
*Attorney, Agent, or Firm*—Townsend and Townsend

[57] ABSTRACT

The interface between a vessel loading crane and a container handling yard has been discovered to be the ideal location for the maintenance of a work bank of containers in conveyance along a one-way, reversible conveyance path. The conveyance path communicates to a vessel loading crane at one end of the path and apparatus for distributing and classifying the containers in the yard at the other end, this apparatus being preferably a bridge crane. Accordingly, a conveyor comprising an overlying support and an underlying shuttle car is disclosed. A shuttle car commutes reversibly along a shuttle car railway under containers supported on the overlying support. The shuttle car is operable to selectively raise containers above the support and move containers on the support reversibly and serially between work stations at either end of the conveyor. The work stations at either end of the conveyor are separated by a container storage interval to permit the supported stowage of one or more serially conveyed containers between the work stations. Circuit logic is disclosed which actuates the shuttle car to serially convey containers in the desired direction of container flow between the work stations.

20 Claims, 8 Drawing Figures

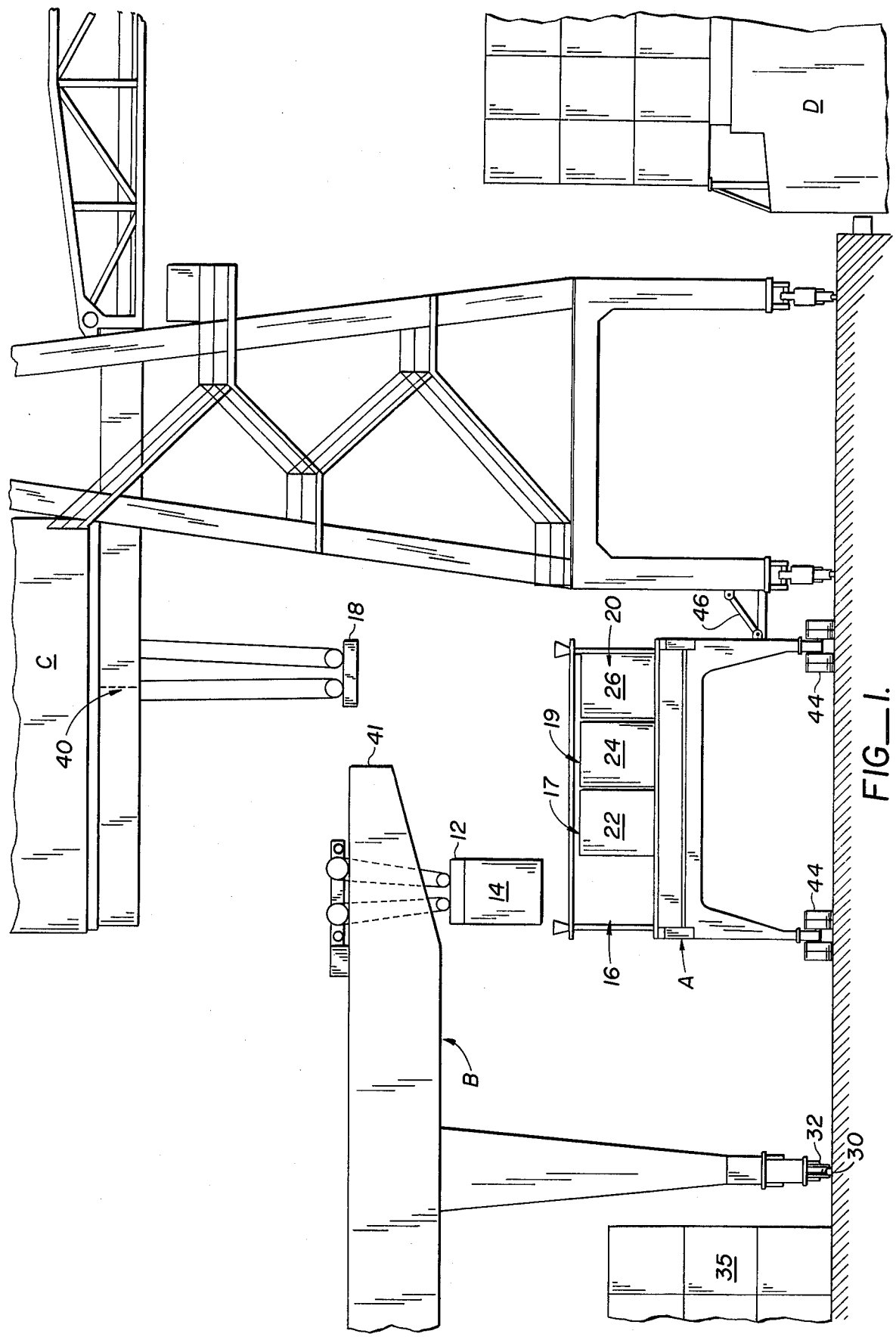
FIG._1.

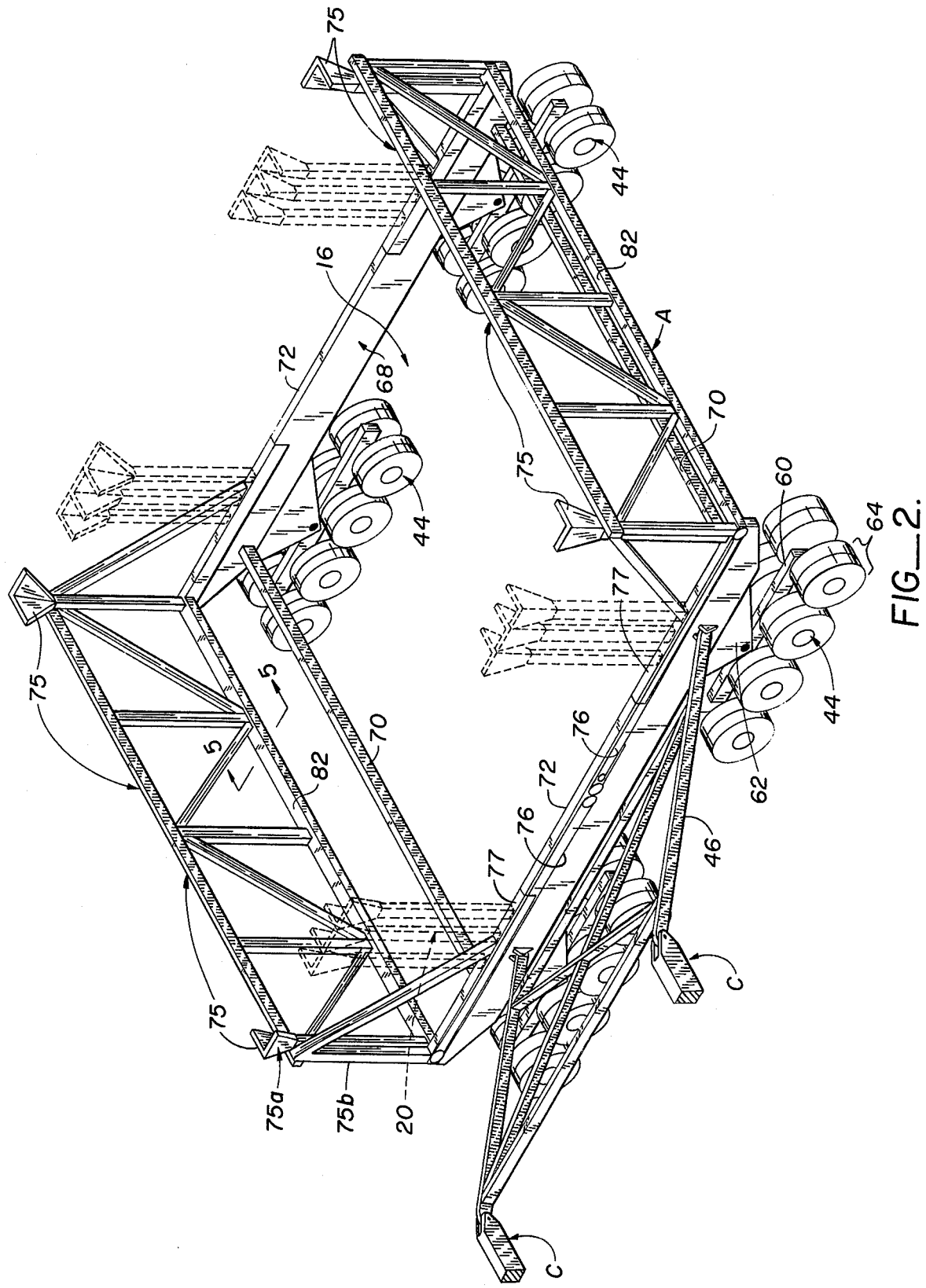

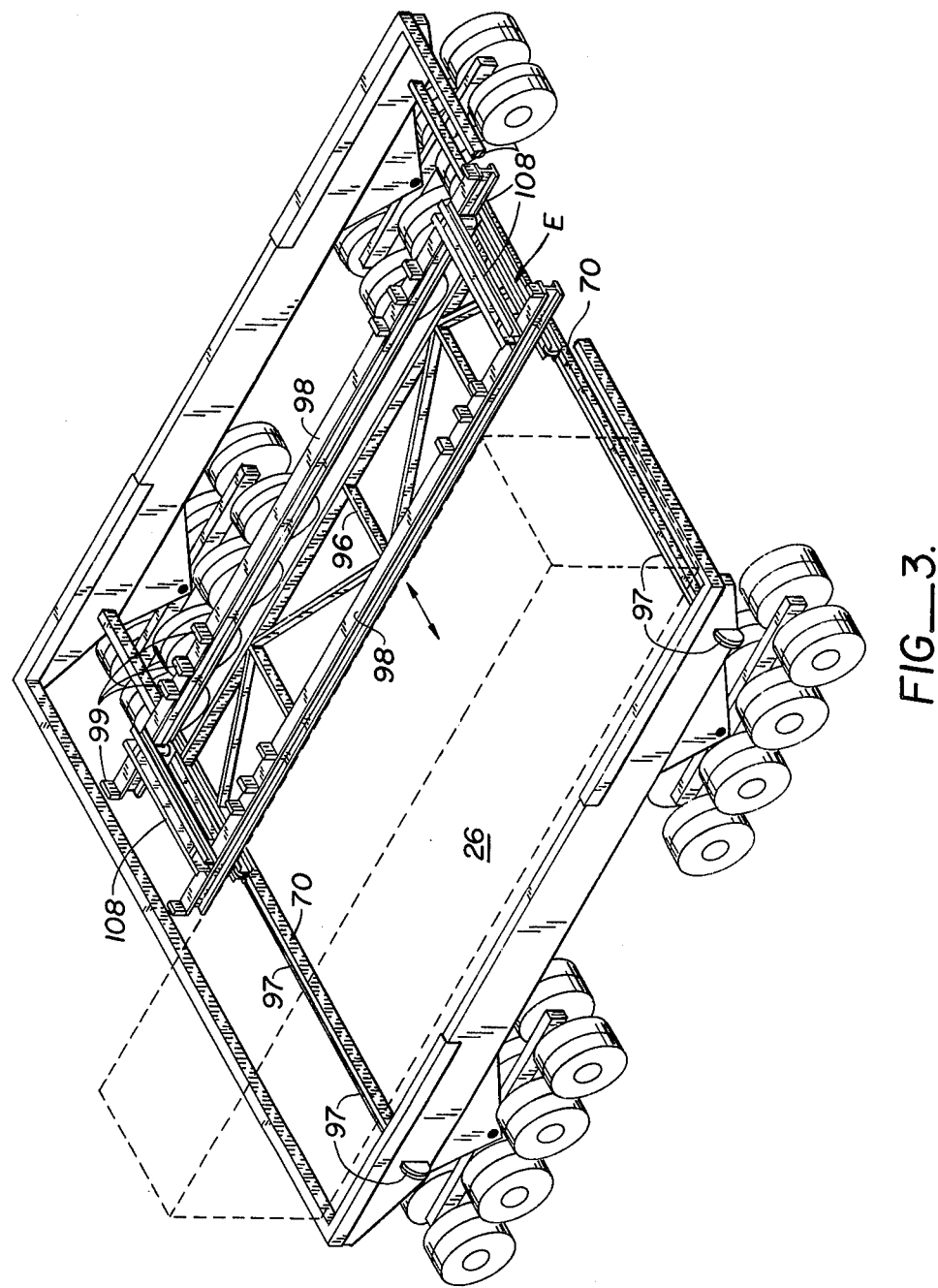
FIG_3.

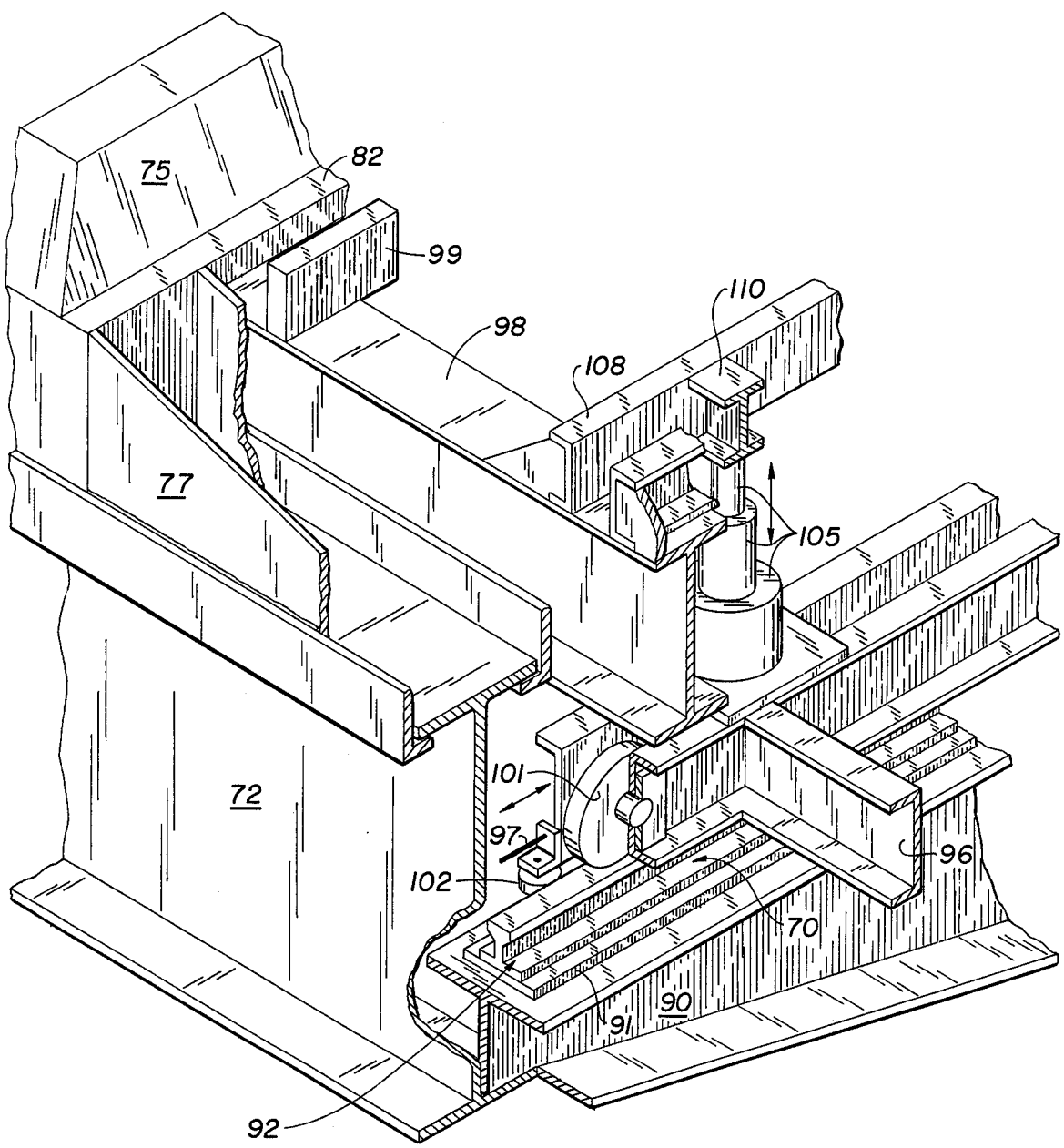
FIG_4.

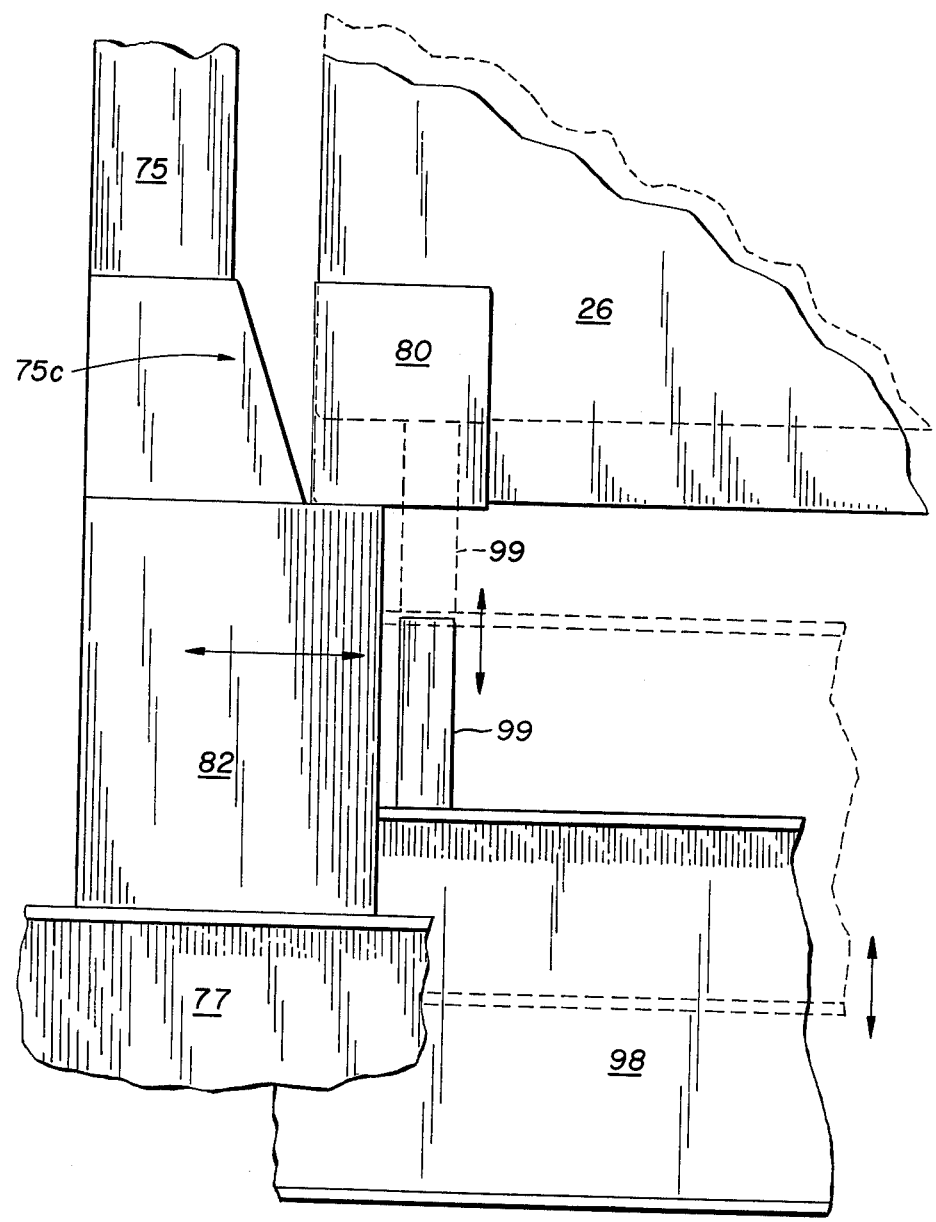
FIG._5.
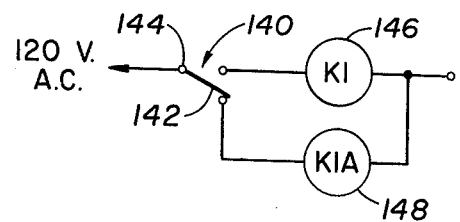
FIG._7.

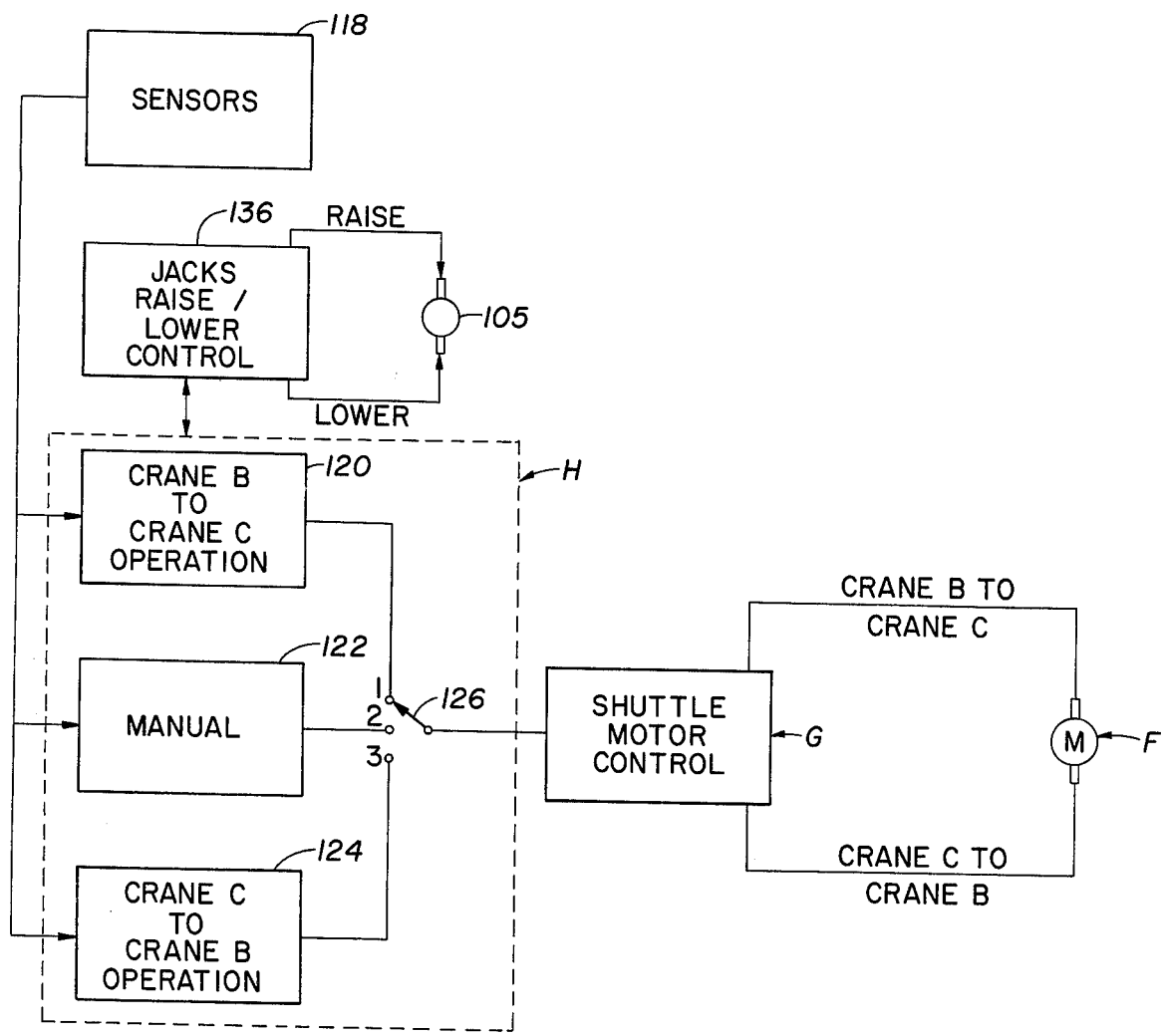
FIG._6.
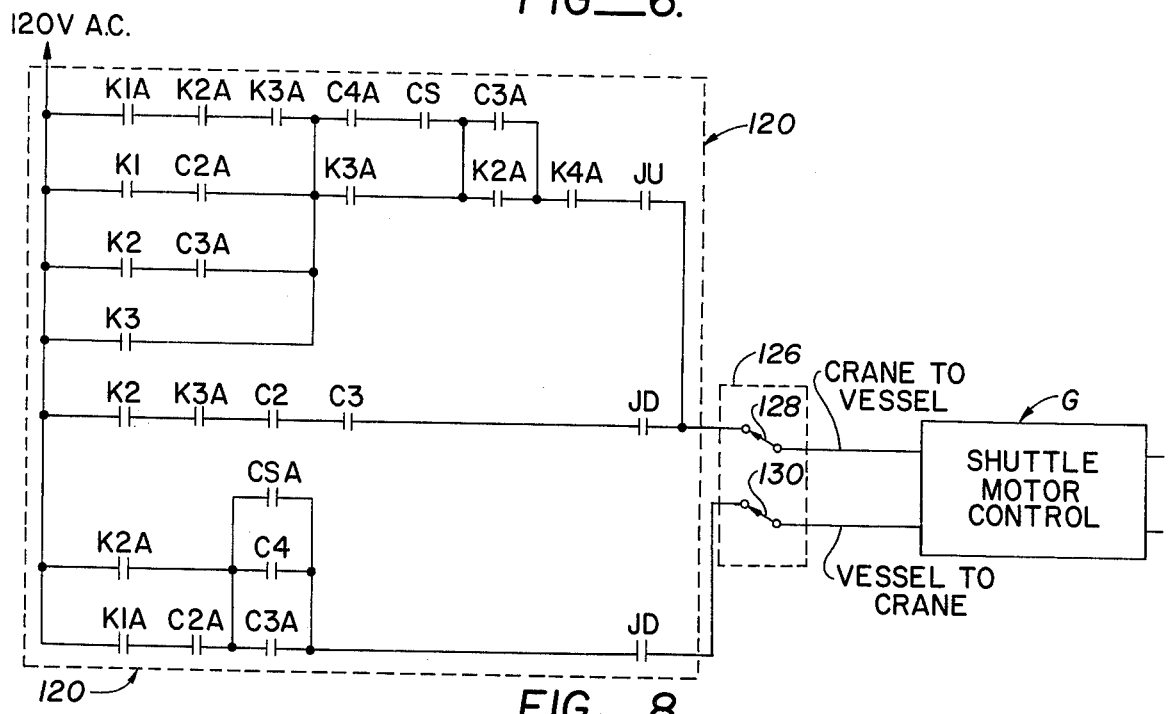
FIG._8.

CONTAINER CONVEYOR APPARATUS AND METHOD FOR VESSEL LOADING CRANE-YARD INTERFACE

This invention relates to article handling by conveyor and specifically to a method and apparatus for conveyance of large containers such as those used on shipboard for transport by container vessels.

STATEMENT OF THE PROBLEM

Container yards are now in wide use for the martialing of containerized cargos to be onloaded and offloaded from vessels. This invention relates to the handling of such containers. Specifically, it relates to the handling of such containers at the interface between a vessel offloading crane and a backup cargo martialing yard. An understanding of the container handling problems between such a vessel loading crane and a martialing yard is necesary to an understanding of this invention.

Cargo onboard ship is loaded within a hold which is provided with numerous cell guides. These discrete cell guides accept containers with the usual requirement for ship stability that the heaviest containers be placed at the bottom, and the lightest at the top to give the transporting vessel a favorable righting moment underway. Naturally, the martialing yard must classify and convey containers to be shipped in anticipation of the ship stability requirements. During vessel offloading, classification by consignee is required.

The interface between the yard classification equipment and the vessel loading crane has heretofore constituted the chief bottleneck in container yards. Typically, where the ship crane has undue delay (as in the handling of hatches or movement between holds and the like), yard classification equipment must wait. Delay results.

Likewise, the yard classification equipment has undue delay (such as with long trips to the consignee stock piling area or long trips to pick up heavier weight containers) equipment must likewise wait.

In short, where either the crane waits on the yard back-up equipment, or the yard back-up equipment waits on the crane, an aggregate of delay occurs. This delay at the interface between the vessel loading crane and the yard classification system effects berth time of the ship and the efficiency of the yard. The entire capacity of the vessel yard system cannot exceed the transmission of containers between the ship offloading crane and the yard classification equipment.

SUMMARY OF THE PRIOR ART

Where the yard consists of individual pieces of equipment for moving carriers (such as "straddle carriers" or individual truck "chassis"), attempts have been made to alleviate the vessel loading crane/yard classification equipment bottleneck at the interface. However, at least four factors have contributed to the unavoidable delay of cargo at this point.

First, such vehicles have traffic patterns with resultant traffic conflicts which restrict the number of vehicles which can service a given crane. Usually, these traffic patterns require either an excess of individual operator driven equipment or the crane waiting on the limited number of individual units servicing the crane.

Secondly, such systems require individual operator driven equipment. Such equipment has a higher accident an maintenance rate. Indeed most damage of cargo in transit occurs in the classification yards.

Third, the movement of empty container conveyance vehicles is always required. Commonly, such movement is confined to a loop path which not only consumes valuable dock side space, but brings to a halt all traffic where it is necessary for a container conveying vehicle to stop at any point along the loop.

Finally, any kind of vehicle system uses large amounts of real estate. As real estate bordering on a quay is commonly difficult and expensive to develop, excessive use of real estate is not desired.

In attempts to cut down the interface between the yard loading crane and the ship loading crane, overlapping cranes have heretofore been considered, but not used. In such overlapping cranes, the depending cable suspended spreaders, as well as handled containers, can come into conflict with each other. The cranes must thereofore move the spreaders up out of the way or laterally move to avoid interference. Because in such systems the possibility of container and conveyor conflict and even collision is always present, and indeed these possibilites can be precipitated by high volume container handling situations common to most container yards, systems involving crane overlap have heretofore not been implemented.

The application of conventional conveyors to solve this problem has heretofore been thought of and rejected. Specifically, where endless belt conveyors have been considered, the support of cargo handling containers has been a problem. Such containers are designed for support on blocks mounted at their corners. Endless belt conveyors do not readily adapt to such a support.

More importantly, in an endless belt conveyor the spatial interval between conveyed articles cannot be changed. Moreover, when an article is deposited at one end of an endless belt conveyor, similar and simultaneous removal must occur at the opposite end of the endless belt conveyor. Thus, the onloading and offloading of such a conveyor must be precisely coordinated and no opportunity for a flexible work bank of containers in conveyance is present.

Roller type or belt type conveyors are unsuitable for container handling. Containers typically have such mass that their gravity conveyance cannot be considered. Moreover, since shipboard cargo containers are by convention adapted for support at blocks located only at their corners, support during conveyance on such conveyors remains an unsolved problem.

SUMMARY OF THE INVENTION

The interface between a vessel loading crane and a container handling yard has been discovered to be the ideal location for the maintenance of a work bank of containers in conveyance along a one-way, reversible conveyance path. The conveyance path communicates to a vessel loading crane at one end of the path and apparatus for distributing and classifying the containers in the yard at the other end, this apparatus being preferably a bridge crane. Accordingly, a conveyor comprising an overlying support and an underlying shuttle car is disclosed. A shuttle car commutes reversibly along a shuttle car railway under containers supported on the overlying support. The shuttle car is operable to selectively raise containers above the support and move containers on the support reversibly and serially between work stations at either end of the conveyor. The work stations at either end of the conveyor are separated by a container storage interval to permit the supported stowage of one or more serially conveyed containers between the work stations. Circuit logic is disclosed which actuates the shuttle car to serially convey containers in the desired direction of container flow between the work stations.

The circuit logic causes one work station to assume an offloading status with any container supported on the conveyor to be remotely and serially conveyed to the work station in the offloading status. Similarly, the circuit logic causes the other work stations to assume an onloading status with the preferred serial conveyance of containers on this work station away from the work station and toward the other work station in the offloading status. Containers being serially conveyed in the container storage interval between the work stations form a work bank of containers in conveyance to thereby minimize the incidents of time periods that either the vessel loading crane or yard distributing and classifying apparatus must pause and wait for discrete containers to arrive at the respective work stations for handling.

In the preferred embodiment provision is made for the conveyor to convey, without crane equipment overlap, between a vessel loading crane and a yard distrbuting and classifying bridge crane with the conveyor tracking the movement of one of the cranes.

OTHER OBJECTS AND ADVANTAGES OF THE INVENTION

An object of this invention is to place a work bank of containers in conveyance between a ship offloading crane and yard classification equipment. According to this object of the invention, a single file path is established between two work stations. Containers are conveyed serially between the respective work stations with variable interval between them. Containers in conveyance between the two work stations form a "work bank" of containers in conveyance.

An advantage of this object of the invention is that the two work stations at either end of the conveyor can function independently from each other. Each work station can receive or discharge containers independently of activity of discharge or reception at the other work station.

A further advantage of the work bank is that the incidence of delay by either the yard classification equipment or the ship loading crane is minimized. Where container handling from one work station on either end of the conveyor is delayed, a work bank of containers in conveyance acts as a unit reservoir to or from the remaining work station. Activity at the remaining work station can still be maintained. Efficiency of the vessel loading crane/yard classification equipment interface is improved with increased efficiency of the yard/vessel system.

A further object of this invention is to disclose a conveyor apparatus that is adapted to a one-way reversible path between two work stations with a work bank of containers in transit therebetween. The conveyor includes a static support frame with a shuttle car running on an underlying path underneath the static support frame. The shuttle car is operable to individually raise and transport containers between varying points on the static support frame. By serially conveying containers from a work station at one end where they are deposited, to a work station at the opposite end where they are removed, the shuttle car remotely conveys and maintains a work bank.

An advantage of this aspect of the invention is that the containers on the conveyors are confined to a discrete automated path. Incidence of damage to the containers can be reduced.

A further advantage of this invention is that the support mechanism disclosed herein can be readily adapted to support containers at their conventional support points -- blocks located at the bottom corners of the container. Support of the containers at other locations where they are fragile and subject to damage is not required.

Yet another advantage of this invention is that the support frame, in supporting the unit containers, is inert.

A further advantage of this invention is that the underlying shuttle car, in traveling underneath the support frame, has no interference with returning vehicles. Moreover, it can move independently and free of the stored containers on the path. Additionally, movement of the shuttle vehicle is independent and free of crane or other equipment which are servicing the work stations at any end of the conveyor.

A further object of this invention is to disclose a mechanism for the widthwise conveyance of containers of varying lengths. Specifically, a support frame is disclosed which can expand and contract to catch at the corners containers of varying lengths. According to this aspect of the invention, the support frame is made with a variable dimension. Where short containers are handled, the support frame is contracted. Where long containers are handled, the support frame is expanded to greater length. Widthwise container conveyance occurs only after the length of the support frame is set.

An advantage of this aspect of the invention is that the conveyance path of widthwise conveyed containers occupies a small interval. This interval is easily contained under a standard overlap between abutted cranes.

A further object of this invention is to disclose in combination with the conveyor a yard bridge crane and vessel container crane of a preferred embodiment. According to this aspect of the invention the vessel offloading crane is provided with an electrical stop which prevents overlap into the path of the yard bridge crane. The conveyor disclosed herein extends in the spatial interval defined by the stop of the yard bridge crane and vessel loading crane.

An advantage of this aspect of the invention is that while the conveyor prevents the need for overlap between the respective bridge cranes, in the absence of the conveyor, transfer between yard and vessel cranes is still possible.

Yet another advantage of this invention is that the narrow spatial interval between closely operated cranes can be used for the necessary work bank.

Yet a further advantage of the preferred embodiment of the yard crane servicing this invention is that ground traffic between the cranes is essentially confined to the conveyor. The need for the presence of individuals and individual pieces of equipment between the cranes is minimized. The possibilities of damage and injury are further reduced.

Yet a further object of this invention is to disclose circuit logic for the serial conveyance of containers between work stations at opposite ends of the conveyor.

Yet a further object of this invention is to transport the conveyor to track the crane. According to this aspect of the invention, the entire conveyor of this invention is mobile over the ground. It is provided with a sensor which is capable of tracking a crane (for example, either the ship offloading crane or the yard crane). By the expedient of either a direct drive from the attached crane or following motorized wheels on the conveyor, conveyor tracking of one of the cranes can occur.

An advantage of this aspect of the invention is that at least one of the cranes is not required to align itself to the conveyor. Rather, the operator of one of the cranes can always anticipate the precise interval of his work station.

Other objects, features, and advantages of this invention will become more apparent after referring to the following specification and attached drawings in which:

FIG. 1 is a side elevation view of a yard bridge crane, an overlapping vessel crane, and the conveyor of this invention shuttling containers between the cranes;

FIG. 2 is a perspective view of the conveyor of this invention illustrating only the support frame of this invention, and illustrating in broken lines the ability of the support frame to handle containers of varying length during "widthwise" conveyance;

FIG. 3 is a perspective view of the conveyor of this invention only illustrating the underlying shuttle car for the transport of containers between the work stations at either end of the conveyor;

FIG. 4 is an enlarged perspective view and detail illustrating the shuttle mechanism and support frame for the purpose of imparting an understanding of their respective construction and working relationship;

FIG. 5 is an enlarged elevation of a container being conveyed by a shuttle car over the support with a rest position of the container being shown in broken lines;

FIG. 6 is a block diagram illustrating the control circuitry of the shuttle car motor;

FIG. 7 schematically illustrates a sensor-relay configuration used in the control circuitry of FIG. 6; and FIG. 8 is a schematic circuit illustration showing contacts of particular relays arranged as a combinational logic circuit to determine the direction of shuttle motor operation in response to conditions sensed by the sensors of FIG. 6.

Referring to FIG. 1, conveyor A of this invention is illustrated having a yard bridge crane B shown depositing a container 14 from spreader 12 onto first work station 16 of the conveyor. A vessel loading crane C is shown lowering spreader 18 to receive a container from work station 20 at the opposite end of the conveyor. Specific containers in transit across the conveyor are illustrated at 22, 24, 26.

Regarding yard bridge crane B, it will be understood that this bridge crane is only shown at a small fraction of its total width. Typically, this crane is mounted to roll on rails 30 at flanged wheels 32 and spans container storage area 35. Typically, bridge crane B has a height that enables four high stacking of containers with a passover of the spreader 12 and attached container 14.

It should be understood that yard bridge crane B includes several advantages. First it assures a minimum interval between stored containers. This assures a higher yard density of containers and additionally gives better yard security because of limited access to the containers.

Secondly, the yard bridge crane is easily registered to the appropriate column and row within the yard to pick up and deposit containers. Minimum attention to crane position is required on the part of the operator.

Finally, the yard bridge crane maintains a minimum personnel in the vicinity of the yard; personnel operate the yard from an overhead position with minimum incidence of injury and the like.

Vessel crane C is of conventional manufacture. Typically, it is provided with an electrical stop at 40. Stop 40 prevents spreaders 18 from moving into a position overlying the end 41 of bridge crane B. As the provided electrical stop 40 is conventional, it is not shown.

It should be understood in the embodiment here illustrated that should conveyor A become inoperative for any reason, electrical stop 40 can be rendered inoperative. Bridge crane B and vessel loading crane C can be operated in a conventional overlapping fashion to effect the transfer of containers between these respective cranes. However, it should be realized that lateral movements (i.e. movement along the length of the tracks) of one or both cranes will be required in the absence of the conveyor apparatus A to prevent containers or crane conflict in each discrete transfer.

Conveyor A is shown in FIG. 1 at a preferred height. Specifically, it is provided with powered wheels 44 and a hinged connection 46 to vessel crane C (see FIG. 2). In the embodiment shown in FIG. 1, conveyor A is elevated a distance above the ground over which the conveyor travels. This elevation permits a one high pass under of container conveyance apparatus such as chassis mounted containers, straddle carriers and other apparatus. Moreover, in the embodiment shown in FIG. 1, it will be immediately seen that each of the containers needs to be lowered a shorter distance from the respective bridge crane B or vessel crane C before being conveyed on the conveyor A. Such a reduced lowering height results in conserved crane time in the handling of each discrete cargo container.

In the embodiment illustrated in FIG. 1, loading of a vessel is occurring. Containers are being taken from the yard storage area 35 by bridge crane B and placed onto work station 16 of the conveyor A. The containers are serially conveyed to the work station 20. At work station 20, they are removed by vessel loading crane at spreaders 18 and deposited on the vessel D in their desired hold. Typically, the vessel D is provided with conventional cell guides (not completely shown) which assure stability of the loaded containers when the vessel is at sea.

It should be understood that conveyor A is partially motorized to follow motorized crane C in its passage from bow to stern over the vessel D being loaded. Such powering is typically effected by wheel motors mounted at wheels 44. For example, wheel motors may be provided at wheels 44 such as those hydraulic wheel motors manufactured by the Char Lynn Corporation of Eden Prarie, Minnesota. Preferably, such wheel motors 44 would be powered by crane actuated hydraulics to apply approximately 75% of the power required to move the conveyor A. The remaining power required to propel the conveyor A is supplied in a mechanical connection at frame 46 to the conveyor A.

It will be just as apparent that any matter of means can be used to have conveyor A track the vessel loading crane C. For example, some systems may require no actual mechanical connection between the conveyor A on one hand, and the conveyor C on the other hand. Likewise, the conveyor A could just as well be operative to track the bridge crane B. It is only required that the conveyor track one or the other of the cranes.

When a conveyor tracks one or the other of the cranes, it will be apparent that the conveyor A will register one of its work stations 16 (in the case of bridge crane B) or 20 (in the case of vessel crane C) to follow the respective crane. With the registration of the work station to a crane, the offloading or onloading of discrete containers to or from that respective crane will be greatly facilitated.

Having described the configuration of the conveyor briefly at the interface between the vessel crane C and yard crane B, detailed attention can be devoted to the construction of the conveyor.

This attention will include a description of the cell guide and static support mechanism for supporting containers with reference to FIG. 2. Thereafter, and with reference to FIG. 3, operation of the shuttle car to shuttle containers widthwise on the conveyor will be set forth.

Referring to FIG. 2, conveyor A is shown in a second and non-preferred ground level configuration, which configuration provides for no pass under of equipment or containers. Referring to FIG. 2, it will be seen that each of the transporting wheels 44 includes a walking beam 60 mounted at a pivot 62. Each walking beam 60 has eight double tired wheels 64 connected thereto. Wheels 64 are typically provided with the hub motors previously referred to for providing motive transport directly to the conveyor A in addition to that motive force supplied through connecting frame 46. Each of the wheels 44 serves to support an overlying frame 68. Frame 68 in itself supports beam mounted rails 70 which rails extend transversely of the frame 68. It is over beam mounted rails 70 that the shuttle car E travels.

Frame 68 includes side members 72. Side members 72 have mounted in sliding relation thereover guide members 75. Guide members 75 serve to gather lowered containers onto each of the respective work stations 16, 20 at either end of the conveyed path.

Referring to FIGS. 1 and 2, containers are initially gathered at their corners at gathering guides 75a. As containers are moved downward they are centered lengthwise by guide barriers 75b. Finally, the immediately before the containers come to rest on support beams 82, a tapered guide beam 75c effects centering of the beam. (See FIGS. 4 and 5).

In the container industry, containers are typically eight feet wide, eight to ten feet in height, and of varying length. Because of their varying length, the gathering means 75 must be mobile on the respective support means 72 to move inwardly and outwardly to accommodate containers of varying length. Accordingly, a chain drive 76 is attached to sliders 77 which ride over the edges of beams 72. Sliders 77 enable the entire gathering means 75 to move into varied positions so that conveyor A can handle containers of varying length. In the embodiment illustrated in FIG. 2, gathering means 75 is extended its full length to receive containers 40 feet in length. Intermediate positions are shown in broken lines. These positions are respectively for 20-foot containers, 24-foot containers, and 27-foot containers. It will be appreciated that main drive 76 is hydraulically powered and only shown on beam 72 adjacent vessel crane C. Duplicate drives are hidden from view on the opposite side of container A adjacent bridge crane B (see FIG. 2).

Referring to FIG. 5, the function of the support of the containers can be understood. Specifically, each of the discrete containers is provided with cast corner blocks 80. For example, referring to FIG. 5 container 26 is shown with such a cast corner block 80 placed in its corner. Gathering means 75 terminates at a position overlying support beam 82. Support beam 82 extends transversely across conveyor A. This support member supports containers by protruding under approximately one half of the corner castings 80. Corner castings 80 of the discrete containers (for example, container 26 illustrated in FIG. 5) come to rest on the support beam. Container support results.

It should be understood that the containers 22-26 illustrated in FIG. 1 can be supported at any position between and including the work stations 16 and 20. All that is required is that the shuttle car 70 shuttle the containers to the respective desired widthwise location and that the containers be there deposited. Once the containers are deposited, support beams 82 will serve to support and maintain the container in place. Passage of the shuttle car underlying the container can occur.

The particular conveyor here illustrated can support four containers in a widthwise disposition. A container can be supported at work station 16. Likewise, a container can be supported at work station 20. Intermediate to work station 16 and work station 20 are two storage stations. Containers in serial transfer between the respective work stations 16, 20 can occur.

Having set forth the function of the gathering means 75 and the support means 82, attention can now be devoted to the shuttle car E as riding on beam mounted rails. Reference to FIGS. 3-5 will be helpful in understanding the function of this mechanism.

Referring to FIG. 4, beam mounted rails 70 are shown mounted to and overlying a beam 90 and a reinforcing plate 91. Typically, rails 92 are fastened on top of reinforcing plate 91 as by welding.

Referring to FIG. 3, it will be seen that shuttle car E consists of two frames. A first and underlying subframe 96 rigidly connects both frames of the shuttle car E. A second and overlying container contact frame 98 has mounted thereto container contact blocks 99. Container contact blocks contact and lift the discrete cargo containers at their corner blocks 80 during shuttle of the respective containers. As will immediately hereinafter be explained with reference to FIG. 4, raising and lowering of frame 98 relative to frame 96 moves blocks 99 into and out of contact with the corner blocks 80 of the respective containers. By raising these corner blocks small distances above the support bars 82, the raised container is then ready for transverse transport. Blocks 99 are variably spaced for various lengths of containers.

Subframe 96 typically rides over rails 92 at a wheel 101. Wheel 101 is registered over the top of the rail 92 by paired sidemounted wheels 102 (only one of such sidemounted wheels being shown in the view of FIG. 4). Typically, wheel 101 is journaled to subframe 96. In its journaling to subframe 96, this wheel supplies the bottom support for jack 105. Shuttle occurs through motor connected drive cables 97.

Container contact frame 98 includes paired channel beams 108 at either end thereof. U-shaped beams 108 (See FIG. 4) are provided with a cross beam 110 which is the upper contact point for jack 105 on container contact frame 98. Jack 105 is supported at its lower end on subframe 96. It can readily be seen that vertical expansion and contraction of jack 105 will raise and lower container contact frame 98. Such raising and lowering of container contact frame 98 will cause blocks 99 to come into and out of contact with the respective corner castings 80 of the discrete containers. Preferably, jacks 105 are of the ball screw variety, and actuated so that they provide simultaneous and equal lifting of container contact frame 98 at its four respective corners.

Referring to FIG. 5, the function of the container contact frame and raising and lowering the discrete containers can be easily understood. Specifically, when frame 98 is elevated, block 99 comes into contact with the inner half of container casting 80. In this position, block 80 is lifted and with it the container. By lifting the container a small distance above the support bar 82, the containers can be shuttled with the shuttle car E. Once the container is shuttled to its desired transfer position (that is, work station 16, work station 20, or the two storage positions therebetween), the container contact frame 98 is lowered, the outward half of corner castings 80 will come into contact with the support beam 82. The container will be supported at rest. Moreover, the shuttle car will be free to commute underneath the resting container. It can then proceed to positions where it may handle and transport other containers independently of the supporting and rested container 26 on the conveyor A.

Having set forth the function of the shuttling conveyor, the circuit logic of this invention can be discussed. First, the position and function of all sensors will be set forth. Secondly, and with reference to the schematic of FIGS. 6-9, the schematic configuration of the circuit logic will be described. Finally, the operation of the circuit logic will be set forth to show the reversible one-way serial path between the respective cranes B and C on the conveyor A.

In essence, conveyor A will have three primary modes of operation, two of which are automatic. The automatic modes provides for container transport operation from crane B to crane C and crane C to crane B; the third mode is manual. It is evident that automatic operation requires the shuttle car 70 to be actuated by minimum inputs of which work stations bear containers, the shuttle car position and the direction containers are to be transported. Additionally, movement of the shuttle car along the conveyor must be made with shuttle jacks 105 in a lowered position to avoid impact between a container that may be at a particular work station and the raised frame 98 of the moving shuttle. Thus, position of the container contact relative to shuttle frame 96 must be known and controlled.

Finally, before a container is moved into work station 20 for crane B to crane C operation (or work station 16 for opposite operation) it must be known whether the container being removed from work station 20 has been lifted to a height above the work station sufficient to allow another container to be moved into the work station. Additional information may be required for automatic operation, depending upon the limitations placed upon the operation of conveyor A.

There are a number of sensor type devices commercially available to gather this information. For example, proximity switches of the type that are activated by the presence of conducing metal may be used. However, it is presently contemplated that the presence (or absence) of a container or the shuttle car at a work station and the position of frame 98 will be detected by limit switch sensors. This type of sensor has a pivotally attached arm that is contacted by an object, causing the arm to pivot and close (or open) a set of contact points indicative of presence of the object. The sensors and their placement to detect objects are well known and, therefore, are not shown. However, there will be at least two such sensors associated with each work station. One sensor will detect the container; the other sensor will detect the shuttle car 70 beneath the work station and will be appropriately placed to stop and register the shuttle to the middle of the container storage interval.

Referring now to FIG. 6, there is shown schematically, in block diagram form, shuttle car motor F electrically connected to shuttle motor control G. Conditions of operation are electrically supplied to the shuttle motor control by decisional circuit H consisting of logic circuits 120, 122, and 124. The logic circuits determine shuttle operation for crane B to crane C operation, manual operation, and crane C to crane B operation, respectively. Selection between the individual logic circuits is made by switch 126. Sensors 118, the limit switches discussed above, are electrically connected as inputs to decisional circuit H.

The hydraulic jack motors 105 are controlled by jack control circuit 136 which also accepts as an input thereto the electrical signals from sensors 118.

The logic circuits 120, 122 and 124 comprise a number of relays, one or more being electrically connected to a particular limit switch sensor. For example, FIG. 7 illustrates a limit switch sensor - relay configuration for detecting the presence or absence of the shuttle car at work station 16. Movement of the lever (not shown) of the limit switch sensor 140 effects movement of sensor contact blade 142 about pivot 144 to selectively apply 120 volts A.C. to the field windings of relays 146 or 148. For example, the position of contact blade 142 as shown in FIG. 7 applies A.C. voltage to relay 148 to cause closure of the relay contacts K1A associated therewith (FIG. 8) and indicates the absence of the shuttle car from the location of work station 16. When the shuttle car moves into its work station 16 position, it will come into contact with the lever arm (not shown) of limit switch sensor 140 causing movement of the arm and concomitant movement of contact blade 142. The 120 volts A.C. to relay 148 is interrupted and applied to relay 146 to effect closure of relay contacts K1 to indicate the presence of the shuttle car in its work station 16 position.

Turning now to FIG. 8, the schematic representation of the relay contacts that comprise the combination logic relay circuitry of logic circuit 120 shown. Similar relay circuit configurations are used for logic circuits 122 and 124 as well as jacks control circuit 136. Since the circuit design used in logic circuits 122, 124 and jacks control circuit 136 may be easily deduced from the explanation of FIG. 8 and they are not shown. closure of any particular relay contact indicates the following:

K1, K2, or K3 = shuttle positioned at work station 16, 17 or 19, respectively

K1A, K2A, K3A or K4A = shuttle absent from position at work station 16, 17, 19 or 20, respectively;

C2, C3 or C4 = containers positioned at work stations 17, 19 or 20, respectively;

C2A, C3A, or C4A = containers absent from work stations 17, 19 or 20, respectively;

CS = sufficient clearance at work station 20;

CSA = insufficient clearance at work station 20;

JU = jacks 105 in the raised, container carrying position; and

JD = jacks in the down position.

With the use of FIG. 8 and the above-identified definitions of the relay contact shown, automatic control of shuttle motor F to drive shuttle car 70 for transporting containers from crane B to crane C may now be described. Assume initially that no containers are located on coveyor A and shuttle car 70 is at its work station 20 position. This condition will be sensed by sensors 118 and if jacks 105 are up, indicate such to jacks control circuit 105. Note that if the jacks are up, 120 volt A.C. power to shuttle motor control G jacks are up 120 volt A.C. power to shuttle motor control G will be interrupted since relay contacts K4A and JD are open. The jacks control circuit will operate jacks 105 to drive them to the down position and cause closure of relay contacts JD. Now, 120 volt A.C. power is applied to the vessel to crane input of shuttle motor control G to drive the motor F in a direction that will cause shuttle car movement toward work station 16.

Once the shuttle car reaches its destination, work station 16, the relay contacts K1A will open. No further movement of the shuttle car will take place until a container will be placed upon work station 16. When this occurs, one of sensors 118 will detect the presence of the container and activate an appropriate relay (not shown) contained in jacks control 136 to cause the jack motor 105 to raise. Once the jack (and container) is in the raised position, relay contacts JU will close. The 120 volt A.C. will then be connected to the crane to vessel input of shuttle motor control G via closed relay contacts K1, C2A, C4A, CS, K3A, K4A, and JU to cause shuttle car 70 to move from work station 16 towards work station 20. Note that the shuttle car vacates work station 16 and passes through intermediate work stations, the 120 volts A.C. electrical connection will change. For example, as the shuttle car leaves work station 16, relay contact K1 will open and relay contact K1A will close, the path is now formed by relay contacts K1A, K2A, K3A, (or C4A, CS), C3A (or K2A), K4A, and JU.

When shuttle car 70 reached and is appropriately positioned beneath work station 20, relay contacts K4A will open to stop shuttle motor F, and therefore the shuttle car. Jacks control circuit 136 will then cause frame 98 to lower the transported container onto work station 20. Once the jacks are down, relay contact JD will close and the shuttle car will again be commanded to travel back to work station 16 by applying the 120 volt A.C. to the vessel to crane input of control G via closed relay contacts K2A (or K1A, C2A), CSA (or C3A), and JD. It may easily be verified, using FIG. 9 and the relay closure definitions above, that the circuitry of logic circuit 120 will direct operation of shuttle motor F, and shuttle car 70, so that automatic transport of containers to work station 20 is effected, with priority given to keeping a container at work station 20 (for crane B to crane C operation).

We claim:

1. A process of conveying containers in the interface between a vessel loading crane and yard classification equipment comprising the steps of: providing a single file conveyance path having a first container work station underlying said vessel loading crane at one end of said path and a second container work station communicated to yard classification equipment at the other end of said path with at least one storage station between said first and second work stations for receiving at least one container; providing an underlying support along said single file conveyance path for the support of one or more containers on said work stations and said storage station; providing apparatus to convey containers deposited at one work station to the other said work station by lifting containers serially one at a time from below said support to a position above said support along said one-way conveyance path to convey containers between said work stations through said storage station whereby the spacing between said serially coveyed containers is variable; and, conveying said lifted containers serially between said work stations along and over said support to convey to said other work station any container on said path and conveying remaining containers on said path to a storage position juxtaposed to any container at said other work station to create a work bank of containers in conveyance between said work stations.

2. The process of claim 1 and wherein said provided apparatus to convey includes the steps of: providing a car for running reversibly along and underlying said support and any containers on said support; and, providing means on said car for raising said containers one at a time above said support path to serially convey containers along said support path.

3. The process of claim 1 including the additional steps of laterally moving said yard classification equipment and moving said conveyance path and underlying support with said vessel loading crane to register one of said work stations to said vessel loading crane.

4. Apparatus for conveying containers, the interface between the vessel loading crane for loading and unloading containers from a vessel and yard classification equipment for distributing containers to and from a container handling yard comprising: an underlying support extending along a single file conveyance path, said underlying support including a first work station underlying said vessel loading crane, a second work station underlying and communicated to yard classification equipment at the remote end of said support from said vessel loading crane and an intermediate storage station for the support of at least one container between said work stations at either end of said support; a car for running reversibly along and underlying said support between said work stations, and any containers resting on said support; means on said car for contacting containers on said support and raising said containers one at time to and from a support position on said support; and, means for moving said car between said work stations along said single file conveyance path for the movement of raised containers one at a time on said path over said support to convey containers from one work station on said path to a storage position juxtaposed to any container at said other work station to create a work bank of containers in conveyance between said work stations.

5. Apparatus according to claim 4 and wherein said support expands and contracts along said conveyance path for receiving respective longer and shorter containers along said conveyance path.

6. The invention of claim 5 and wherein said means for contacting containers on said support includes a plurality of support points for contacting respective containers of various lengths for raising and lowering said containers of various lengths.

7. Apparatus for conveying containers in the interface between a vessel loading crane for loading and unloading containers from a ship and yard classification equipment for distributing containers to and from a container handling yard wherein said vessel loading crane includes lateral movement for passing over variable athwart ships positions to a vessel being loaded or unloaded comprising: an underlying support extending along a single file conveyance path, said underlying support including a first work station underlying said vessel loading crane, a second work station underlying and communicated to yard classification equipment at the remote end of said support from said vessel loading crane, and at least one storage station including an intermediate support for the support of at least one container between said work stations at either end of said support; means for conveying said underlying support in registry with said vessel loading crane to move said underlying support to said first work station in registry with said vessel loading crane upon lateral movement of said crane to a variable athwart ship position; a car for running reversibly along said support underlying said support and any containers resting on said support, means on said car for contacting containers on said support and raising said containers serially one at a time to and from a support position on said support; and means for moving said car between said work stations along said single file conveyance path for movements of said containers on said path over said support to convey containers between said work stations through said storage station whereby the spacing between said serially conveyed containers is variable.

8. The apparatus of claim 7 and wherein said means for laterally moving said underlying support includes a mechanical attachment to said crane and with said support to following in registry with said crane.

9. The invention of claim 7 and wherein said support is raised above ground to permit the passage of at least one container under said support.

10. Apparatus for conveying containers in the interface between a vessel loading crane for loading and unloading containers from a vessel in yard classification equipment for distributing containers to and from a container handling yard wherein each of said containers is provided with lower castings, on which lower castings said container is designed to rest, said apparatus comprising: an underlying support extending along a single file conveyance path, said underlying support including a first work station underlying said vessel loading crane, a second work station underlying and communicated to yard classification equipment at the remote end of said support from said crane, and an intermediate storage station for the resting storage of at least one container between said work stations; said underlying support spaced for receiving a portion of the blocks of each of said containers to rest said containers along said single file conveyance path; a car for running reversibly along said support underlying said support and any containers resting on said support; and means for contacting said only one of containers on said support at said castings, said contacting means spaced to contact said castings at a portion not contacted by said underlying support; means for raising and lowering said contacting means for correspondingly raising and lowering one of said containers at a time to and from said rest position on said support; and means for moving said car between said work stations along said single file conveyance path for the movement of a single raised container on said path over said support to convey containers between said work stations through said storage station whereby the spacing between said serially conveyed containers is variable.

11. The invention of claim 10 and wherein said support means includes paired bars extending the length of said conveyor parallel to said single file conveyance path.

12. The invention in claim 10 and wherein said support means expands and contracts to accommodate variable spacing between said blocks on containers being supported on said support means.

13. The invention of claim 10 and wherein said support is raised above said ground to permit the passage of at least one container under said support.

14. Apparatus for conveying containers in the interface between vessel loading crane and yard classification equipment comprising: and underlying support along a single file conveyance path for the support of one or more containers between and on work stations at either end of said path, a first work station underlying said vessel loading crane at one end of said path a second work station communicated to yard classification equipment at the other end of said path at least one storage station between said first and second work stations for receiving at least one container; a shuttle car; means for moving said shuttle car reversibly between said work stations on a path underlying said support and any containers resting on said support; means for raising containers one at a time above said support attached to said shuttle car to thereby move raised containers with movement of said shuttle car; and means for conveying serially between said work stations along and over said support said raised containers operably connected to said means for moving and means for raising, said means for actuating said serial conveyance operable to conveying any container on said path from one of said work stations through said storage station to the other of said work stations and remotely conveying any other container on said conveyor to a juxtaposed storage position to any container at the other of said work stations whereby the spacing between said serially conveyed containers is variable.

15. The invention of claim 14 and including a railway underlying said support; and said car riding on said railway for moving said support in a direction transverse to said conveyance path.

16. Invention of claim 14 and wherein said conveyor is provided with means for moving said conveyor over the ground.

17. In combination a vessel loading crane for loading and unloading containers from the vessels; a yard bridge crane for distributing containers to and from a container handling yard, said yard bridge crane extending over a substantial width of said yard; a conveyor extending in the interval between said loading crane and said yard bridge crane, said conveyor including: an underlying support extending along a single file conveyance path, said underlying support including a first work station underlying said vessel loading crane, a second work station underlying and communicated to said yard bridge crane; at least one intermediate storage station support for the support of at least one container between said work stations at either end of said support; a car for running reversibly along said support underlying said support and any containers resting on said support; means on said car for contacting containers on said support and raising containers one at a time to and from a support position on said support; and, means for moving said car between said work stations along a single file conveyance path for movement of containers one at a time on said path over said support to convey containers between said work stations through said storage station whereby the spacing between said serially conveyed containers is variable.

18. The invention of claim 17 and wherein said car has connected thereto means for conveying containers serially between said work stations and along and over said support to convey to one of said work stations any container on said path and conveying remaining containers on said path juxtaposed to any container on said one work station to create a work bank of containers in conveyance between said work stations.

19. Invention claim 17 and wherein said vessel loading crane overlaps said yard bridge crane; and said vessel loading crane is provided with a stop to prevent interfering container movement of said vessel loading crane over said yard bridge crane.

20. Apparatus for conveying containers in the interface between a vessel loading crane for loading and unloading containers from a vessel and yard classification equipment for distributing containers to and from a container handling yard wherein each of said containers is provided with lower castings on which said container is designed to rest, said apparatus comprising: an underlying support extending along a single file conveyance path, said underlying support including a first work station underlying the vessel loading crane, a second work station underlying and communicated to yard classification equipment at the remote end from said crane, sand at least one intermediate storage station for the support of at least one container between said work stations at either end of said support; said support spaced for receiving a portion of said castings of each of said containers to rest said containers along said single file conveyance path; said supports movable to a variable spacing to permit containers with various spacing between said castings to be supported on said supports; a car for running reversibly along said support underlying said support and any containers resting on said support; means on said car for contacting only one of said containers at a time at said castings of said container, said contacting means including a plurality of blocks, said blocks being placed in anticipation of various spacings of said castings; said blocks spaced to contact said castings at a portion not contacted by said support at said spacings of said support; means for raising and lowering said contacting means for correspondingly raising and lowering container one at a time to and from said rest position on said supports; and, means for moving said car between said work stations along said single file conveyance path for the movement of raised containers serially on said path over said support to convey containers between said work stations through said storage station whereby the spacing between said serially conveyed containers is variable.

* * * * *